United States Patent
Kwon et al.

(10) Patent No.: US 11,219,038 B2
(45) Date of Patent: Jan. 4, 2022

(54) METHOD AND APPARATUS FOR WIRELESS COMMUNICATION BASED ON FREQUENCY SELECTIVE TRANSMISSION IN WIRELESS LOCAL AREA NETWORK

(71) Applicant: ELECTRONICS AND TELECOMMUNICATIONS RESEARCH INSTITUTE, Daejeon (KR)

(72) Inventors: Hyoung Jin Kwon, Daejeon (KR); Sok Kyu Lee, Daejeon (KR); Jae Seung Lee, Daejeon (KR); Min ho Cheong, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 71 days.

(21) Appl. No.: 16/869,374

(22) Filed: May 7, 2020

(65) Prior Publication Data

US 2020/0267741 A1    Aug. 20, 2020

Related U.S. Application Data

(63) Continuation of application No. 16/191,286, filed on Nov. 14, 2018, now Pat. No. 10,687,342, which is a
(Continued)

(30) Foreign Application Priority Data

Nov. 4, 2013 (KR) .......................... 10-2013-0133146
Nov. 4, 2014 (KR) .......................... 10-2014-0152226

(51) Int. Cl.
*H04W 72/12* (2009.01)
*H04L 25/02* (2006.01)
(Continued)

(52) U.S. Cl.
CPC ........ *H04W 72/121* (2013.01); *H04B 7/0452* (2013.01); *H04L 5/0037* (2013.01);
(Continued)

(58) Field of Classification Search
None
See application file for complete search history.

(56) References Cited

U.S. PATENT DOCUMENTS 8,902,921 B2 * 12/2014 Liu ...................... H04B 7/0452
                                                                  370/442
8,917,603 B2 * 12/2014 Yang ..................... H04J 3/1694
                                                                  370/235

(Continued)

FOREIGN PATENT DOCUMENTS

KR    10-2008-0058263 A    6/2008
KR    20120127728 A    11/2012
(Continued)

OTHER PUBLICATIONS

International Search Report for PCT/KR2014/010524 filed on Nov. 4, 2014.

*Primary Examiner* — Hong S Cho

(57) ABSTRACT

Disclosed are a wireless communication method, and an access point and a station which perform the wireless communication method. A wireless communication method performed by an access point according to an embodiment may include performing channel sounding on a plurality of subchannels, identifying subchannels selected by stations
(Continued)

among the subchannels, scheduling communications between the AP and the stations based on the selected subchannels, and transmitting a data frame to the stations through the subchannels based on a scheduling result.

19 Claims, 12 Drawing Sheets

Related U.S. Application Data continuation of application No. 15/025,879, filed as application No. PCT/KR2014/010524 on Nov. 4, 2014, now Pat. No. 10,165,584.

(51) Int. Cl.
| | | |
|---|---|---|
| *H04L 5/00* | (2006.01) | |
| *H04B 7/0452* | (2017.01) | |
| *H04L 27/26* | (2006.01) | |
| *H04W 84/12* | (2009.01) | |
| *H04B 7/0417* | (2017.01) | |

(52) U.S. Cl.
CPC ...... *H04L 25/0204* (2013.01); *H04L 25/0224* (2013.01); *H04L 27/2613* (2013.01); *H04B 7/0417* (2013.01); *H04L 5/005* (2013.01); *H04L 5/0007* (2013.01); *H04L 5/0023* (2013.01); *H04L 5/0044* (2013.01); *H04W 72/1231* (2013.01); *H04W 84/12* (2013.01)

(56) References Cited

U.S. PATENT DOCUMENTS

| | | | |
|---|---|---|---|
| 9,179,455 B2* | 11/2015 | Park | H04W 72/02 |
| 9,184,892 B2* | 11/2015 | Novak | H04W 72/082 |
| 2010/0144359 A1* | 6/2010 | Song | H04W 28/16 |
| | | | 455/450 |
| 2010/0260246 A1 | 10/2010 | Cheong et al. | |
| 2011/0222472 A1* | 9/2011 | Breit | H04L 1/0033 |
| | | | 370/328 |
| 2012/0263090 A1 | 10/2012 | Porat et al. | |
| 2013/0058239 A1* | 3/2013 | Wang | H04L 25/0228 |
| | | | 370/252 |
| 2013/0188627 A1 | 7/2013 | Cheong et al. | |
| 2014/0204891 A1* | 7/2014 | Park | H04L 5/0007 |
| | | | 370/329 |

FOREIGN PATENT DOCUMENTS

| | | |
|---|---|---|
| KR | 20130079550 A | 7/2013 |
| KR | 20130082476 A | 7/2013 |
| WO | WO2011103368 A1 | 8/2011 |
| WO | 2012011725 A2 | 1/2012 |
| WO | 2013022254 A2 | 2/2013 |
| WO | 2013077652 A1 | 5/2013 |

* cited by examiner

METHOD AND APPARATUS FOR WIRELESS COMMUNICATION BASED ON FREQUENCY SELECTIVE TRANSMISSION IN WIRELESS LOCAL AREA NETWORK

CROSS-REFERENCE TO RELATED APPLICATIONS

This application is a continuation of U.S. patent application Ser. No. 16/191,286 filed Nov. 14, 2018, which is a continuation of U.S. patent application Ser. No. 15/025,879 filed Mar. 29, 2016, now U.S. Pat. No. 10,165,584, issued Dec. 25, 2018, which is a National Stage of International Patent Application No. PCT/KR2014/010524, filed Nov. 4, 2014, which claims the benefit of Korean Patent Application No. 10-2013-0133146 filed Nov. 4, 2013, and Korean Patent Application No. 10-2014-0152226 filed Nov. 4, 2014, the disclosures of which are herein incorporated by reference in their entirety.

TECHNICAL FIELD

Exemplary embodiments relate to a wireless communication technology based on frequency selective transmission in a wireless local area network (WLAN).

BACKGROUND ART

A local area network (LAN) as a communication network for a limited area generally includes a cabled LAN and a wireless LAN (WLAN). A WLAN enables communications via a network using radio waves instead of employing a cable. The WLAN has been introduced as an alternative for addressing difficulties in installation, maintenance and movement caused by cabling and become increasingly needed with growing mobile users.

A WLAN is formed of an access point (AP) and a station (STA) as a terminal device. The AP is a device sending radio waves to enable WLAN users within in a coverage area to connect to the Internet and to use the network, which functions like a hub of a cabled network. An AP for a wireless high-speed Internet service provided by an Internet service provider (ISP) is already installed in a service area.

A basic architecture of an IEEE 802.11 network is a basic service set (BSS). The IEEE 802.11 network includes an independent BSS in which terminals in the BSS communicate directly with each other, an infrastructure BSS which involves an AP in communications of a terminal with terminals in and outside the BSS, and an extended service set in which BSSs are connected to extend a service area.

DISCLOSURE OF INVENTION

Technical Solutions

A wireless communication method performed by an access point (AP) according to an embodiment may include performing channel sounding on a plurality of subchannels; identifying subchannels selected by stations among the subchannels; scheduling communications between the AP and the stations based on the selected subchannels; and transmitting a data frame to the stations through the subchannels based on a scheduling result.

The scheduling of the communications between the AP and the stations may include scheduling a group of stations to which the data frame is simultaneously transmitted through different subchannels based on the selected subchannels.

The transmitting of the data frame may simultaneously transmit the data frame to the stations through different subchannels based on the scheduling result.

The identifying of the subchannels selected by the stations may identify the subchannels selected by the stations based on subchannels through which a frame is transmitted from the stations.

The performing of the channel sounding may include transmitting a sounding frame for channel sounding through the subchannels.

The transmitting of the sounding frame may transmit a Null Data Packet (NDP) frame through the subchannels within a time interval of a Restricted Access Window (RAW) set by the AP.

The NDP frame may be transmitted with a Long Training Field (LTF) padded so that NAP frames transmitted through the subchannels have the same length.

The stations may perform channel estimation based on the NDP frame transmitted by the AP and select a subchannel to use for communications among the plurality of subchannels based on a channel estimation result.

The stations may transmit a feedback on channel information and subchannel selection information to the AP after receiving the sounding frame.

The transmitting of the data frame may simultaneously transmit data frames to the stations through antennas corresponding to the respective subchannels based on a scheduling result.

The identifying of the subchannels selected by the stations may include receiving subchannel selection information from the stations; and identifying the subchannels selected by the stations based on the received subchannel selection information, and the subchannel selection information may include selection information on at least one subchannel preferred by a station among the plurality of subchannels.

The stations may transmit a frame to the AP through the selected subchannels among the plurality of subchannels.

The stations may transmit information on at least one or more preferred subchannels among the plurality of subchannels to the AP.

The transmitting of the data frame may include identifying all multi-subchannels as one group identification (ID) to conduct signaling.

The transmitting of the data frame may include selecting a single-user multiple-input multiple-output (SU-MIMO) mode or multi-user multiple-input multiple-output (MU-MIMO) for each subchannel; and identifying a subchannel with the SU-MIMO mode selected as an association ID (AID) to conduct signaling and identifying a subchannel with the MU-MIMO mode selected as a group ID to conduct signaling.

The scheduling of the communications between the AP and the stations may include scheduling a frequency resource used for communications between the AP and the stations based on the subchannels selected by each station; and broadcasting information on the scheduled frequency resource.

The stations may adjust a size of a feedback frame and transmit the feedback frame with the size adjusted to the AP.

A wireless communication method performed by a station according to an embodiment may include selecting a preferred subchannel among a plurality of subchannels; transmitting a frame to an AP through the selected subchannel;

receiving resource scheduling information from the AP; and communicating with the AP based on the resource scheduling information.

The selecting of the subchannel may include performing channel estimation based on an NDP frame received from the AP; and selecting the preferred subchannel among the subchannels based on a channel estimation result.

An AP according to an embodiment may include at least one antenna; a receiver to receive a frame through a subchannel among a plurality of subchannels from each of stations through the at least one antenna; and a transmitter to transmit resource scheduling information based on subchannels selected by the stations to the stations through the at least one antenna, wherein the subchannels selected by the stations may be identified by subchannels used to transmit the frame.

A station according to an embodiment may include at least one antenna; a transmitter to transmit a frame to an AP through a preferred subchannel among a plurality of subchannels through the at least one antenna; and a receiver to receive resource scheduling information from the AP through the at least one antenna, wherein the resource scheduling information may be determined based on subchannels selected by stations.

An AP according to an embodiment may include at least one antenna; a receiver to receive feedback frames comprising information on a preferred candidate subchannel among a plurality of subchannels from a plurality of stations through the at least one antenna; and a transmitter to broadcast resource scheduling information generated by scheduling resources between the AP and the stations to the stations, wherein the resource scheduling information may be determined based on the information on the candidate subchannel.

The AP may schedule frequency resources by allocating subchannels used for communications to the stations based on the information on the candidate subchannel.

The AP may allocate subchannels used for communication to the stations and control the stations to conduct channel sounding through the subchannels in parallel.

The transmitter may transmit data to the stations through beamforming in subchannels allocated to the stations.

A station according to an embodiment may include at least one antenna; a transmitter to transmit a feedback frame comprising information on a preferred candidate subchannel among a plurality of subchannels to an AP; and a receiver to receive resource scheduling information from the AP through the at least one antenna, wherein the AP may generate the resource scheduling information based on information on a candidate subchannel received from a plurality of stations.

The AP may transmit an NDP frame through the subchannels, and the transmitter may transmit, to the AP, a feedback frame on at least one subchannel among subchannels used to transmit the NDP frame.

The transmitter may transmit a list of candidate subchannels preferred by the station among the subchannels to the AP.

The transmitter may transmit a signal-to-noise ratio (SNR) of a subchannel or SNR of a group of tones to the AP, and the AP may generate the resource scheduling information based on the SNR of the subchannel or SNR of the group of tones.

The station may perform channel sounding via a subchannel allocated by the AP.

DETAILED DESCRIPTION OF EXEMPLARY EMBODIMENTS

Figure 1:
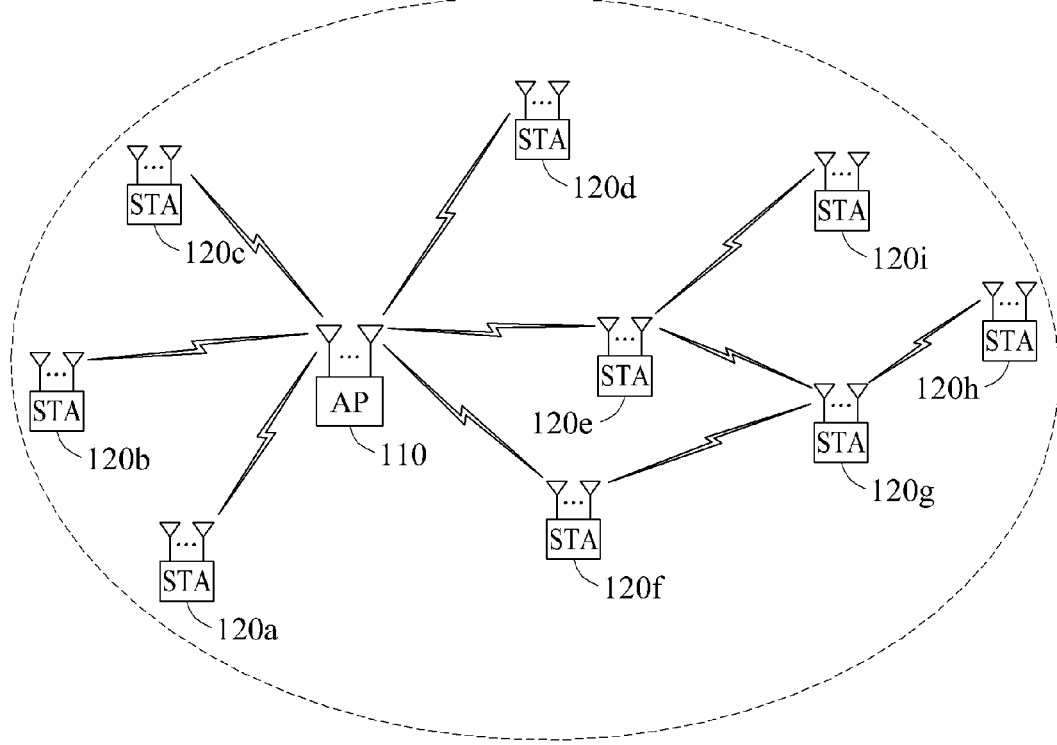
FIG. 1 illustrates a wireless local area network (WLAN) environment according to an embodiment.

Hereinafter, exemplary embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters.

The following embodiments are constructed by combining components and features of the present invention into particular forms. Each component or feature may be considered optional unless mentioned otherwise. Each component or feature may be embodied in a separate form from another component or feature. Also, some components and/or features may be combined to construct an embodiment of the present invention. Operations illustrated in embodiments of the present invention may be carried out in a different order. Some elements or features of one embodiment may be included in another embodiment or be replaced with corresponding elements or features of another embodiment.

Specific terms to be used in the following description are provided for better understanding of the present invention and may be changed with other forms without departing from the technical scope of the present invention.

In some cases, to prevent the concept of the present invention from being ambiguous, structures and apparatuses of the known art will be omitted, or will be shown in the form of a block diagram based on main functions of each structure and apparatus. Also, like reference numerals refer to like elements throughout the specification.

The embodiments of the present invention may be supported by standards disclosed in at least one of wireless access systems, such as Institute of Electrical and Electronics Engineers (IEEE) 802 system, 3rd Generation Partnership Project (3GPP) system, 3GPP Long-Term Evolution (LTE) and LTE-Advanced (LTE-A) system and 3rd Generation Partnership Project 2 (3GPP2) system. That is, operations or portions not mentioned in the embodiments to clarify the technical scope of the present invention may be supported by the standards. All terms used in this specification may be explained by the standards.

The following technology may be used for various types of wireless access systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be realized by radio technologies, such as Universal Terrestrial Radio Access (UTRA) or CDMA2000. TDMA may be realized by radio technologies, such as Global System for Mobile communications (GSM)/General Packet Radio Service (GPRS)/Enhanced Data Rates for GSM Evolution (EDGE). OFDMA may be realized by radio technologies, such as IEEE 802.11 (Wi-Fi), IEEE 802.16 (WiMAX), IEEE 802-20, and E-UTRA (Evolved UTRA). Although the following description will be made with reference to the IEEE 802.11 system for clarity, the technical scope of the present invention is not limited thereto.

FIG. 1 illustrates a multi-input multi-output (MIMO) wireless local area network (WLAN) system according to an embodiment.

The WLAN system 100 may include one or more basic service sets (BSSs). The WLAN system 100 may include an access point (AP) 110 and stations (STAs) 120a to 120i. For simplicity, FIG. 1 shows a single AP 110 only.

The AP 110 is a functional entity which provides connection to a distributed system 100 via a wireless medium for an STA associated with the AP 110. The AP 110 may communicate with one or more STAs at a randomly determined moment via downlinks and uplinks of the STAs. Downlinks are communication links from the AP 110 to the STAs 120a to 120i, and uplinks are communication links from the STAs 120a to 120i to the AP 110. An STA may communicate with another STA peer to peer.

In a BSS including the AP 110, communications between STAs are basically performed via the AP 110, but direct communications between STAs are possible, not via the AP 110, when a direct link is established between the STAs. The AP 110 may also be referred to as and configured as, for example, a central controller, a base station (BS), node-B or a base transceiver system (BTS).

An STA may also be referred to as and configured as a mobile terminal, a wireless device, a wireless transmit/receive unit (WTRU), user equipment (UE), a mobile station (MS), a mobile subscriber unit or simply a user.

The AP 110 may simultaneously transmit data to a station group including at least one or more STAs among the STAs 120a to 120i associated with the AP 110.

The wireless system 100 supports multi-user multi-input multi-output (MU-MIMO) communication. The MU-MIMO communication system 100 enables the AP 110 to transmit a plurality of spatial streams to a plurality of STAs using a multi-antenna. Also, when the AP 110 employs a plurality of transmitting antennas, the AP 110 may transmit data frames to the STAs 120a to 120i using beamforming (BF) technology to improve transmission performance.

When the AP 110 conducts frequency selective transmission (FST) using a narrowband subchannel in a broadband BSS of the wireless system 100, the AP 110 may simultaneously perform FSTs using different subchannels.

When subchannels to be used by the STAs are identified before data is transmitted to the STAs, the AP 110 may create one group from STAs to use different subchannels and schedule a single transmission for the group. For instance, the STAs may transmit information on subchannels to use for FST to the AP 110, and the AP 110 may schedule communications with the STAs 120a to 120i based on the received information on the subchannels from the STAs.

The AP110 may simultaneously conduct FSTs through orthogonal subchannels in MU-MIMO mode, thereby improving throughput of the network as compared with FST using a single subchannel.

The AP 110 needs channel information on STAs to which a data frame is transmitted and may perform channel sounding to acquire the needed channel information. Channel sounding means a procedure of feeding back channel status information, which may be performed based on a Null Data Packet (NDP) frame and an NDP Announcement (NDPA) frame. An NDP frame has a PLCP Protocol Data Unit (PPDU) format excluding a data field of a Media Access Control (MAC) layer and may also be referred to as a sounding frame. PLCP represents Physical Layer Convergence Procedure. The AP 110 may use an NDP frame to extract the channel information from the STAs.

The STAs may perform channel estimation based on the NDP frame received from the AP 110 and feed channel status information as a channel estimation result back to the AP 110. For example, the STAs may estimate an MIMO channel based on Very High Throughput-Long Training Fields (VHT-LTFs) of the NDP frame to acquire the channel information.

An NDPA frame is transmitted to indicate an STA to receive an NDP frame and may also be referred to as a sounding announcement frame. An STA may determine through an NDPA frame whether the STA participates in channel sounding. The AP 110 may include information on a target STA of channel sounding in an NDPA frame to transmit to the STA. The AP 110 may direct the STA to receive an NDP frame using the NDPA frame.

The AP 110 may transmit the NDPA frame and the NDP frame based on a Restricted Access Window (RAW). An RAW is a time period during which only specific STAs are allowed to access a channel but other STAs are not allowed.

The AP 110 uses a plurality of transmitting antennas and a plurality of receiving antennas for data transmission via downlinks and uplinks. Each of the STAs 120a to 120i may include one or more antennas. The STAs 120a to 120i may have the same number or different numbers of antennas.

According to another embodiment, in a WLAN system 100 supporting OFDMA, the AP 110 may schedule communications of STAs for simultaneous transmissions via frequency resources with different bandwidths and match transmission times and lengths of frames. Accordingly, simultaneous transmissions through synchronization of the frames are enabled in frame exchanges within a Transmit Opportunity (TXOP) obtained by the AP 110 even in an asynchronous WLAN, thus improving throughput of the network.

In subchannel selective transmission (SST) as FST, each of the STAs 120a to 120i selects one subchannel in each beacon interval and exchanges frames with the AP 110 through the selected subchannel. Here, in one beacon interval, the STAs 120a to 120i are not allowed to move to other subchannels provided by the AP 110 to conduct SST and to transmit frames through a plurality of subchannels. Thus, the STAs may have difficulty in using an optimal frequency resource depending on traffic or rapid channel change. To employ an optimal frequency resource depending on traffic or rapid channel change, OFDMA assigning STAs resources varying on circumstances of the STAs is employed.

Hereinafter, an embodiment in which OFDMA is possible will be described.

Like SST, OFDMA also needs a sounding process in order to indicate a channel favored by an STA to the AP 110. Sounding may be performed by simultaneously transmitting an NDP packet, the NDP packet being constructed in a sequential sweep for channel estimation of an OFDMA unit resource, for example, a frequency and time, being constructed in iterative bandwidth mode, or being constructed in combination of the sequential sweep and iterative bandwidth mode. After sounding is performed using a sounding packet, such as an NDP packet, the STA may transmit a feedback on channel information and information on a favored subchannel to the AP 110. Feeding back all channel information enables the AP 110 to conduct optimal resource scheduling but causes too heavy feedback information, whereas conducting transmission merely via a favored subchannel without sending information on the favored subchannel as in SST minimizes a feedback information amount but allows only restricted scheduling since scheduling is possible only via a subchannel selected by an STA. In the present invention, STAs may provide channel indication to the AP 110 through the foregoing two-operation method.

In a first operation, the STAs 120a to 120i transmit information on candidate subchannels preferred by the STAs to the AP 110. Here, the STAs 120a to 120i may also feed channel status information back to the AP 110. For instance, the STAs may provide an average signal-to-noise ratio (SNR) by subchannel or an SNR of a group of specific tones as the channel status information to the AP 110.

The STAs 120a to 120i may feed subchannels having a metric exhibiting a channel characteristic of a subchannel, for example, an SNR, greater than a predetermined threshold as candidate subchannels back to the AP 110 according to predetermined rules. Also, when the AP 110 conducts scheduling by a plurality of predetermined adjacent subchannels, a list of bands with channel status information greater than a threshold among bands including the plurality of adjacent subchannels may be fed back to the AP 110. Here, to apply frequency selectivity as an advantage of OFDMA, resources may be classified into groups of a plurality of smaller tones other than a single subchannel, and a list of the resources and channel information by resource may be fed back. The resources may be interleaved resources formed by grouping a plurality of interspersed tones in a frequency space, or be burst resources formed by grouping adjacent tones. Unlike SST indication, frame transmission of an STA for such indication at 2.4 GHz or 5 GHz is basically carried out through a primary channel.

The AP 110 collecting indication information on the STAs 120a to 120i may schedule resources to allocate to the STAs 120a to 120i based on the collected indication information. Here, the AP 110 may schedule frequency resources of the STAs. Scheduling information may include a list of STAs to simultaneously use a divided frequency resource and information on a resource to be used by each STA. The scheduling information may be constructed as an STA identification (ID) list by sequentially allocating unit frequencies to STAs, or as an index list by determining an OFDMA group in advance like an MU-MIMO group, transmitting an OFDMA group ID only, and allocating an index of an STA in the OFDMA group for resource allocation. In this case, an STA ID is 6 bytes in an MAC address, and 2 bytes even in use of an association ID (AID), and STAs are identified by bits expressing a number of STAs belonging to a group, and thus pieces of information as many as bits*unit resource may be provided. Also, each frequency resource may be allocated not to a single STA but to a plurality of STAs as in an MU-MIMO group. The AP 110 broadcast the scheduling information on the frequency resource, so that the STAs 120a to 120i may identify whether the STAs 120a to 120i are included in a schedule and identify a location of a frequency resource to use if included. Further, broadcasting the scheduling information is basically carried out by transmission including a primary channel and may be conducted in duplicate (DUP) mode for protection against other channels.

In a second operation, the AP 110 may perform accurate channel estimation to improve throughput by scheduled frequency resource. Channel estimation is performed by frequency resource and aims at simultaneously estimating a plurality of resources. Channel estimation is similar to SU/MU BF sounding performed by subchannel after SST indication mentioned above. A difference is that a bandwidth for SU/MU sounding may vary by frequency resource in OFDMA, unlike a fixed subchannel. For instance, when a 50 GHz band is used, one frequency resource is 20 MHz or another frequency resource is 60 MHz. Here, since BF feedback may be performed by subcarrier to cause a substantial amount of information, feedback via other resources may be performed in parallel to reduce necessary time for feedback. Another difference is that OFDMA may perform transmit power control to decrease interference, for which necessary information may be exchanged. To this end, the AP 110 may include power information in a scheduling announcement frame, and the STAs may transmit a feedback including power related information. Information to be included may vary on a transmit power control algorithm.

In addition to BF feedback, matching sizes of feedback frames of the STAs to simultaneously conduct feedback is also essentially considered. Lengths of the feedback frames vary depending on quantities for the STAs to feed back and a modulation and coding scheme (MCS) selected at feedback. However, in order that the AP 110 having a single model conducts simultaneous transmission/reception and switches transmission/reception modes, not only times at which the STAs send frames but also lengths of the frames need matching. Then, after the frames are received, the transmission/reception modes are switched to simultaneously transmit a BF report poll frame for requesting a next feedback with respect to a plurality of resources after a Short Interframe Space (SIFS). To this end, the AP 110 may additionally announce a duration value of one packet via the scheduling announcement frame, the NDP announcement frame or the BF report poll frame. When a BF feedback frame of an STA is longer than the duration value, the STA may transmit the BF feedback frame via fragmentation according to a BF sounding protocol. When the poll frame is transmitted from the AP 110, the STA may transmit a subsequent segment to the AP 110. However, when the BF feedback frame is shorter than the duration value announced by the AP 110, feedback data is transmitted as an Aggregated MAC Protocol Data Unit (A-MPDU), and accordingly the AP 110 may transmit the A-MPDU via padding to correspond to the duration value. When the BF feedback frame is matched, the AP 110 is able to match transmission times of poll frames and also match lengths of frames to be simultaneously transmitted by the AP 110, and thus frame exchanges is carried out within an SIFS in a TXOP for sounding of a plurality of resources simultaneously established without interference by other STAs.

When duration information is added in BF sounding, the duration information may also be used for multi-subchannel SU/MU-MIMO sounding using SST and data transmission. Here, to announce a new duration value, the AP 110 may define and announce an existing NDPA frame or new Announcement frame so that the STAs match durations of uplink frames and do not extend a bandwidth beyond subchannels thereof to conduct transmission since other subchannels are used for transmission.

When the aforementioned two operations of sounding are finished, the AP 110 may start data transmission. In this case, data transmission may be conducted following sounding in the same TXOP as for sounding or be conducted in a new TXOP. Through sounding, all time resources and power resources by STAs may be allocated. STAs participating in actual OFDMA data exchanges may vary considering BF sounding and power control, in which case new frequency resources may be allocated. Resource scheduling information regarding frequency, time and power may be broadcast through an OFDMA indication frame broadcast by the AP.

The STAs may receive the OFDMA indication frame and identify from the OFDMA indication frame whether the STAs are included in a schedule, durations and locations of frequency resources allocated to the STAs. Also, the STAs may identify a transmit power level for a frame that the AP 110 transmits via a downlink, and accordingly a clear channel assessment (CCA) level may be adjusted in a corresponding frequency resource. After an SIFS since transmission of the indication frame, the AP 110 may transmit data through the frequency resources, and transmit data through BF when SU/MU-MIMO BF sounding is performed by resource. The data may be simultaneously transmitted through the frequency resources, and durations of downlink packets are the same to match transmission times of subsequent uplink packets of the STAs, and the STAs 120a to 120i may transmit response frames or data frames to the frames received by the STAs to the AP 110. Here, the STAs may transmit data at a transmit power level set by the AP 110.

Figure 2:
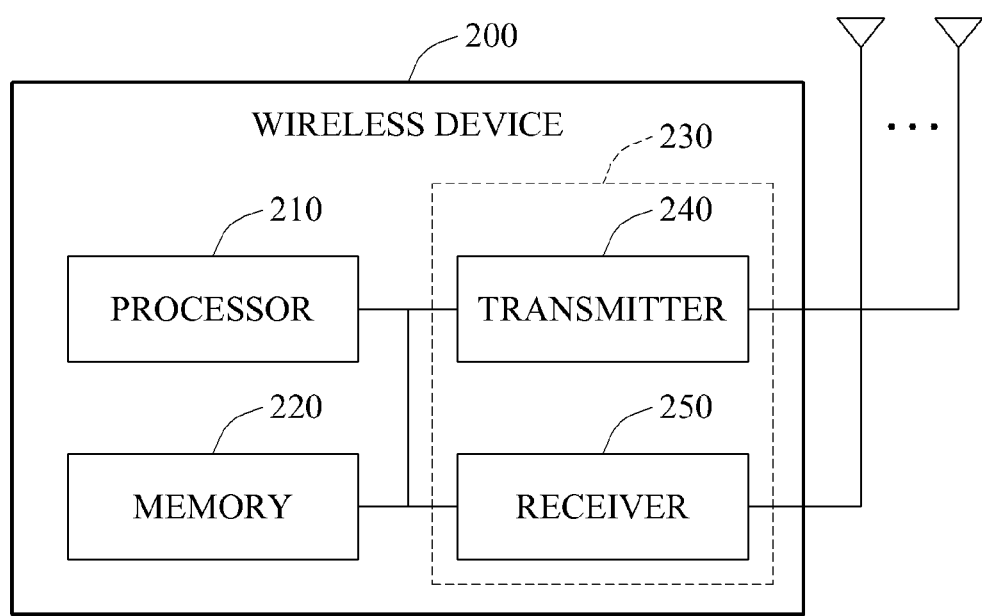
FIG. 2 illustrates a configuration of a wireless device adoptable for a WLAN system according to an embodiment.

FIG. 2 illustrates a configuration of a wireless device adoptable for a WLAN system according to an embodiment.

The wireless device 200 is an illustrative apparatus configured to implement various methods described herein. The wireless device 200 may be an AP or STA according to the present invention.

The wireless device 200 includes a processor 210 controlling an operation of the wireless device 200. The processor 210 may also be referred to as a central processing unit (CPU). A memory 220 may provide program instructions and data to the processor 210 and include both a read only memory (ROM) and a random access memory (RAM). The processor 210 generally performs logical and arithmetic operations based on the program instructions stored in the memory 220. Furthermore, the processor 210 may detect and quantify levels of signals received by a transceiver 230. The program instructions stored in the memory 220 may be executable to implement the methods illustrated herein.

The wireless device 200 may include the transceiver 230 to communicate with other devices. The transceiver 230 may include a transmitter 240 and a receiver 250 and be controlled by the processor 210. The wireless device 200 may include one antenna or a plurality of antennas, and the antennas may be electrically coupled to the transceiver 230.

The wireless device 200 may detect and quantify the levels of the signals received by the transceiver 230. The wireless device 200 may detect the signals as total energy, energy per sub-carrier by symbol, power spectral density and other signals. The processor 210 may digitize signals to process digital signals.

In one embodiment, when the wireless device 200 operates as an AP, the receiver 240 may receive a frame through any one of a plurality of subchannels from STAs through at least one antenna. The transmitter 250 may transmit resource scheduling information based on subchannels selected by the respective STAs to the STAs through the at least one antenna. The subchannels selected by the STAs may be identified through subchannels through which frames of the STAs are transmitted.

In one embodiment, when the wireless device 200 operates as an STA, the transmitter 250 may transmit a frame to an AP through a preferred subchannel among a plurality of subchannels through at least one antenna. The AP may sequentially or simultaneously transmit an NDP frame through the subchannels, and the STA may receive the NDP frame and conduct channel estimation on the subchannels based on the NDP frame. The STA may determine a subchannel preferred by the STA based on a channel estimation result and transmit a frame through the preferred subchannel, thereby notifying the AP of information on the preferred subchannel. The receiver 240 may receive resource scheduling information from the AP through the at least one antenna. The resource scheduling information may be determined based on a subchannel selected by each STA.

In another embodiment, when the wireless device 200 operates as an AP in an OFDMA communication system, the receiver 240 may receive feedback frames including information on a preferred candidate subchannel among a plurality of subchannels from a plurality of STAs through at least one antenna. The AP may schedule subchannels to allocate to the STAs based on the feedback frames received from the STAs. The AP may determine subchannels to allocate to the respective STAs based on the information on the candidate subchannel received from the STAs and generate resource scheduling information including information on the subchannels allocated to the STAs. The AP may generate resource scheduling information on frequency resources based on channel status information and the information on the candidate subchannel received from the STAs. The transmitter 250 may broadcast the resource scheduling information generated by scheduling resources between the AP and the STAs to the STAs. The AP may control the STAs to adjust transmission times and sizes of the feedback frames received from the STAs. The transmitter 250 may transmit packet duration information for matching the sizes of the feedback frames to the STAs. The STAs may adjust the sizes of the feedback frames based on the packet duration information received from the AP. The packet duration information may be included in any one of a scheduling announcement frame, an NDPA frame and a BF report poll frame at transmission. The transmitter 250 may simultaneously transmit data to the plurality of STAs through the plurality of subchannels based on the resource scheduling information. The transmitter 250 may transmit data to the STAs through BF via the subchannels allocated to the STAs. The foregoing process may improve throughout of the network through multi-user diversity by utilizing frequency selectivity.

Alternatively, when the wireless device 200 operates as an STA in the OFDMA communication system, the STA may perform channel estimation based on a sounding packet received from the AP. The transmitter 250 may transmit coarse information needed for resource scheduling performed by the AP to the AP. For example, the transmitter 250 may transmit a list of preferred candidate subchannels among a plurality of subchannels, SNR information on the subchannels or SNR information by tone group to the AP. Specifically, the transmitter 250 may transmit channel status information such as the SNR information on the subchannels to the AP. The receiver 240 may receive packet duration information for adjusting a size of a feedback frame from the AP, and the STA may adjust the size of the feedback frame based on the packet duration information. The transmitter 250 may transmit the feedback frame with the size adjusted based on the packet duration information back to the AP. The STA may perform channel sounding only in a subchannel allocated by the AP. Here, the AP may control STAs to conduct channel sounding in parallel through the respective subchannels. As channel sounding is conducted in parallel, channel sounding overhead may be reduced. The receiver 240 may receive resource scheduling information from the AP through at least one antenna. The AP may generate the resource scheduling information based on information on the candidate subchannels received from the plurality of STAs. The STA may identify a subchannel to use for communication with the AP based on the resource scheduling information received from the AP, and the transmitter 250 may transmit data to the AP through the identified subchannel. The STA may transmit data to the AP at a transmission power level determined by the AP.

Figure 3:
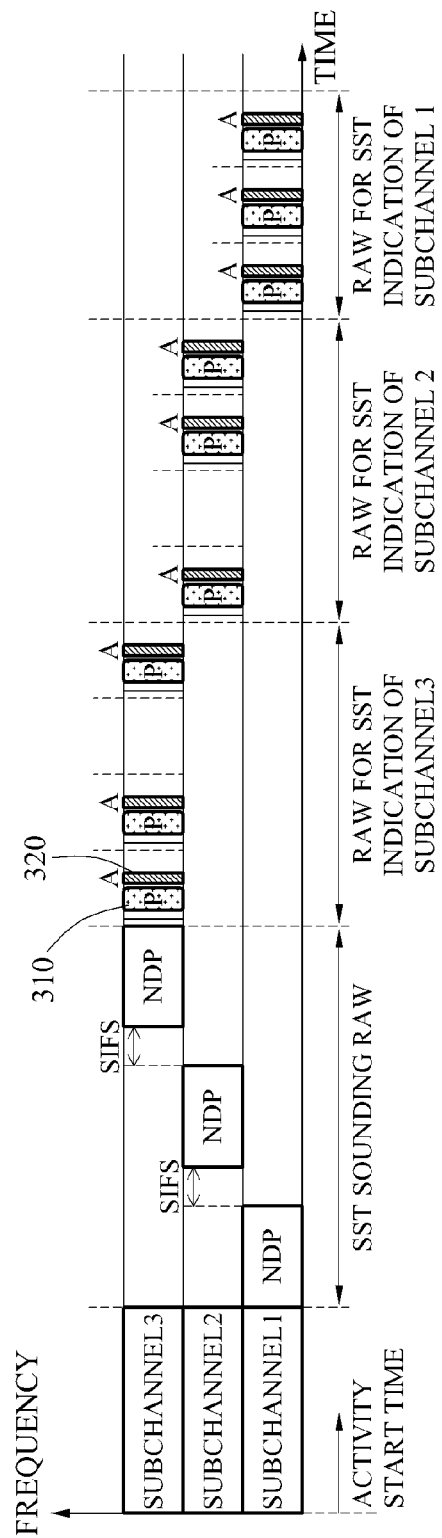
FIG. 3 illustrates a subchannel selective transmission (SST) operation according to an embodiment.

FIG. 3 illustrates an SST sounding process according to an embodiment.

An AP may communicate with STAs based on FST. In FST, the STAs may select optimal frequency bands for the STAs and communicate with the AP using the selected frequency bands. The AP may communicate with the STAs based on subchannel selective transmission (SST).

The AP may transmit a beacon signal including a channel list enabling SST to the STAs. Information for FST is included in the beacon signal as an SST information element (IE). One SST IE represents channels having the same schedule in a channel activity bitmap. The STAs may receive the beacon signal from the AP and identify channels permitted by the AP through the SST IE of the beacon signal.

The STAs are allowed to conduct SST through channels to be used by the STAs among the permitted channels during a period from an Activity Start Time to a Target Beacon Transmission Time (TBTT) at which a next beacon signal is transmitted and thus may carry out SST during the period. Here, transmission of a frame having a bandwidth (BW) of a maximum presentation protocol data unit (PPDU) is permitted.

The STAs may transmit data to the AP through the subchannels selected by the STAs. When the SST IE indicates that an uplink (UL) activity is off and a downlink (DL) activity is on, the STAs may transmit a Power Save Poll (PS Poll) frame 310 including information on the subchannels selected by the STAs to the AP.

When the AP receives the data from the STAs through the subchannels, the AP may verify that the STAs use the subchannels.

The AP may transmit a downlink frame to the STAs using the subchannels selected by the STAs up to a maximum transmission width. The AP may simultaneously transmit data to the STAs conducting SST through different subchannels.

In downlink transmission that the AP transmits data to the STAs, the AP may transmit frames using different subchannels and different antennas.

The STAs successfully receiving the frames from the AP may transmit an acknowledgement (ACK) frame 320 to the AP at determined times for the respective STAs. When a Block Acknowledgement Request (BAR) frame is received from the AP, the STAs may transmit a Block Acknowledgement (BA) frame to the AP.

Since the frames are simultaneously transmitted using the different subchannels, throughput increases by about a number of subchannels times on average as compared with when using one subchannel.

The AP may perform subchannel sounding and sounding for selecting an optimal subchannel for an STA capable of conducting SST based on a value of an Active Start Time field of the SST IE after a time at which FST is permitted.

The AP sets an RAW to allow only an STA participating in SST sounding to access a channel and sets an SST sounding RAW and an SST PS-Poll RAW for an STA capable of conducting SST. In a time period set as an RAW, only an STA permitted by the AP may communicate with the AP and other STAs not permitted are prevented from communicating.

The SST sounding RAW is an RAW during which the AP broadcasts a frame for SST sounding.

In the SST PS-Poll RAW, the STA receiving the beacon signal or Traffic Indication Map (TIM) broadcast frame sends a PS-Poll frame through a subchannel to be used by the STA so as to notify the AP that the STA is ready to receive data, and thus the AP successfully receiving the PS-Poll frame may identify which subchannel the STA is to use.

The AP may perform SST sounding to acquire information on a subchannel used for SST.

In the SST sounding RAW for SST sounding, the AP may sequentially transmit an NDP frame through the subchannels for STAs capable of transmitting and receiving data only through one subchannel. An NDP frame may have a PPDU format excluding a data field of an MAC layer.

The STA may move the subchannels and estimate a channel through the NDP frame received from the AP in the SST sounding RAW. The STA may select an optimal subchannel based on a channel estimation result and access the channel to transmit a PS-Poll frame to the AP in the SST PS-Poll RAW indicating the selected sub-channel. Subsequently, the STA may perform SST through the sub-channel used to transmit the PS-Poll frame after receiving an ACK frame from the AP.

FIG. 3 shows an example of the foregoing SST sounding process. Subchannels are scanned and transmitted in the SST sounding RAW, which is for STAs capable of listening only through a narrowband at a time to acquire channel status information on all subchannels.

However, in the presence of wideband STAs only, a frame for sounding may be duplicated and transmitted by SST unit in iterative bandwidth mode. Further, the same effect may be obtained by transmitting a beacon signal in iteration mode without a separate RAW. Also, an SST PS-Poll RAW is a method of restricting channel access to reduce collision probability when a large number of STAs are present. The PS-Poll frame 310 is for retrieving buffered downlink data from the AP but may be replaced with another frame, not being necessarily protected by an RAW.

When it is not identified which sub-channel the AP is present in or transmission needs to be carried out before an Activity Start Time, transmission may also be carried out through a primary channel, in which a frame format indicating a subchannel to use or field element format is defined newly. Moreover, to indicate a plurality of subchannels, the STA may transmit an entire bitmap to the AP, activating a bit corresponding to a preferred subchannel and inactivating a bit corresponding to a non-preferred subchannel in a bitmap representing all subchannels as in a Channel Activity Bitmap field. For example, the STA may set the bit corresponding to the preferred subchannel to 1 and the bit corresponding to the non-preferred subchannel to 0. The bitmap provides an option to the AP so that the AP may dynamically set and allocate resources for STAs in an activated subchannel depending on resources or data amount in a network.

The AP may determine an MU-MIMO group based on the subchannel indicated by the STA. Here, the subchannel to be used by the STA refers to a subchannel used to transmit the PS-Poll frame 310 of the STA received in the SST PS-Poll RAW as in FIG. 3. Alternatively, when any PS-Poll frame is not transmitted, the subchannel is a last subchannel used to transmit a frame through SST. The AP may calculate time needed for data transmission based on data amounts to be transmitted to STAs and channel status information estimated from indications of the STAs. The AP may schedule a group of STAs engaged in simultaneous transmissions based on data amounts, time needed for data transmission, priority information such as an access class category of data, a quality of service parameter such as latency requirements, scheduling policies, or the like.

The STA may select an optimal subchannel for the STA among a plurality of narrowband subchannels permitted by the AP. FSTs between the AP and the STAs using different subchannels are orthogonal, and thus simultaneous data transmissions are possible. When subchannels are used, the subchannels are orthogonal in a frequency domain, enabling an MU-MIMO mode.

Figure 4:
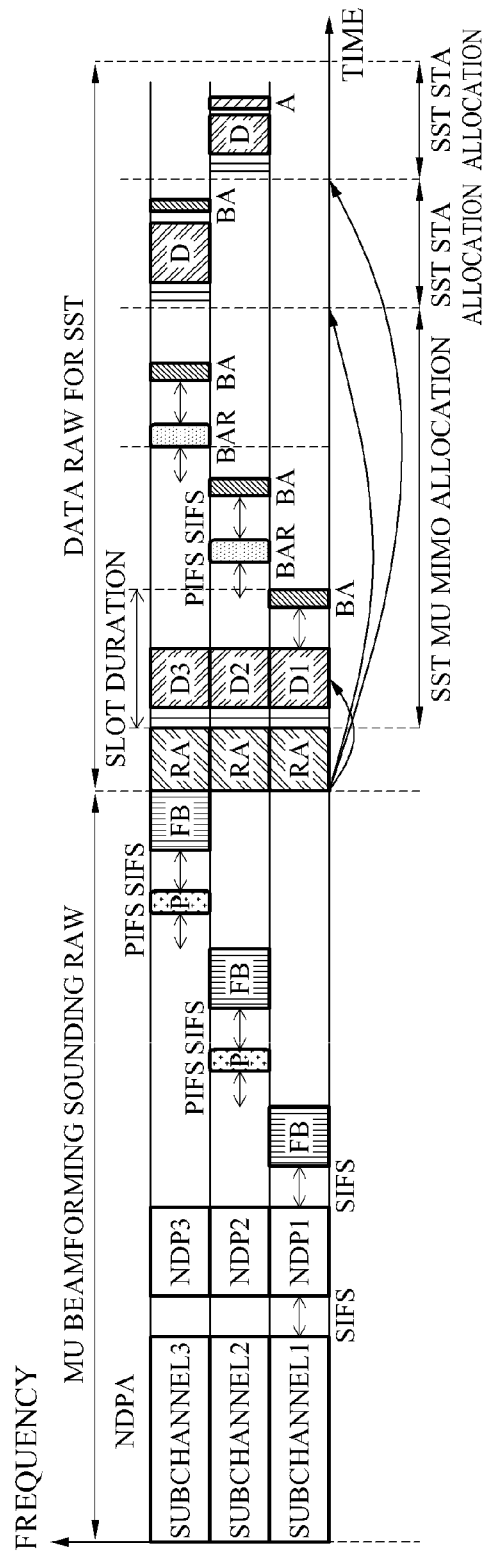
FIG. 4 illustrates a scheduling operation of an access point (AP) according to an embodiment.

FIG. 4 illustrates a scheduling operation of an AP according to an embodiment.

In SST according to the embodiment, the AP and STAs operate as follows. The AP may signal data transmission to an STA group engaged in simultaneous transmission. Signaling schemes include a method of signaling to a single group of all multi-subchannels and a method of signaling to each subchannel group. The former method is an MU-MIMO extending scheme, in which an entire STA group is identified by a group ID. In the latter method, an SU-MIMO mode or MU-MIMO mode is selected by subchannel and signaling is conducted by identifying a subchannel with an AID when the SU-MIMO mode is selected or by identifying a subchannel with a group ID when the MU-MIMO mode is selected. While SST is performed, the STAs exchange frames only via subchannels selected by the STAs and operate independently of operations of STAs through other subchannels. Here, as it is assumed that the AP is a single modem, the AP may need to synchronize frames sent via downlinks in multi-subchannels and to match lengths of the frames transmitted through the respective subchannels. Then, the AP may receive response frames transmitted by the STAs after an SIFS through the respective subchannels within a cyclic prefix (CP).

The MU-MIMO extending method will be described. The MU-MIMO mode involves a BF sounding process, which may be performed even in multi-subchannel transmission, because different numbers of antennas are used by the AP per subchannel for SST sounding and for the MU-MIMO mode using SST. That is, SST sounding uses all antennas of the AP, while the MU-MIMO mode employs different antennas to transmit space time streams to STAS for channel orthogonality, so that STAs using different subchannels obviously use different antennas. Thus, MU-MIMO BF sounding using an antenna subset needs to be performed by subchannel of the MU-MIMO mode. An MU-MIMO BF sounding RAW of FIG. 4 is an RAW for MU-MIMO BF sounding for SST, which includes NDPA, NDP and BF feedback in order. An NDPA frame may be broadcast in the same format as in the IEEE 802.11ac MU-MIMO mode. Here, since STAs use SST, the NDPA frame needs a bandwidth iteration mode by SST unit and may be transmitted in non-high throughput (HT) duplicate mode of IEEE 802.11ac. An NDP frame is transmitted for sounding after an SIFS.

The NDP frame may be transmitted in non-HT duplicate mode the same as the NDPA frame. An STA listening to the NDPA and NDP frames via a subchannel selected by the STA may transmit a BF feedback (FB) through the subchannel as in FIG. 4. Subsequently, the AP may transmit a data frame through BF. Like a sounding RAW, an RAW for data transmission may also be set using IEEE 802.11ah. Here, a slot for each data transmission may be allocated in the RAW, wherein a slot for MU-MIMO mode transmission may use a group ID, instead of an AID for identifying an individual STA.

As in FIG. 4, when a resource allocation (RA) frame is used at a beginning of a data RAW, the AP may signal a slot allocated in the RAW to an STA in an MU-MIMO group through the group ID instead of the AID. Here, a channel indication bitmap field of an RAW parameter set information element (RPS IE) signaling the RAW needs to set all subchannels to be used by the MU-MIMO group to 1. Further, the RA frame duplicates and transmits a packet transmitted through each subchannel by subchannel using the bandwidth iteration mode. That is, when a single subchannel bandwidth is a basic unit of the duplicate mode, the AP may duplicate and transmit a PPDU with a preamble and a payload forming a packet which are formed of the same signals by subchannel selected by an STA belonging to the MU-MIMO group. However, a data frame transmitted in a next allocated slot is not transmitted in the bandwidth iteration mode, unlike the broadcast RA frame, because different antennas correspond to subchannels and different numbers of antennas are used for the subchannels and thus the preamble changes and each data is transmitted by STA in unicast mode.

In detail, a common part of a preamble of a data frame transmitted in MU-MIMO mode is common to all MU-MIMO STAs and thus the same common part is transmitted through each subchannel, whereas a different dedicated part of the preamble for a stream using a different antenna by STA is transmitted by subchannel. However, a preamble length and a data packet length may vary due to the different part by STA, and thus padding is performed to a length of a longest MPDU after a last MPDU in order to match the lengths in the MU-MIMO mode of 802.11ac. In the present invention, padding is performed in the same manner. Subsequently, a block acknowledgement (BA) process is also carried out in the same way as in the MU-MIMO mode of 802.11ac. Here, a BAR frame and a BA frame are basically transmitted only via the subchannels of the STAs but may also be transmitted in bandwidth iteration mode to prevent access by other STAs between the data frame and the BAR frame. FIG. 4 illustrates an example of the aforementioned MU-MIMO BF sounding and SST MU-MIMO data transmission processes. As shown in FIG. 4, although transmitted through different subchannels, BF feedback frames when sounding is performed or BA frames in data exchanges may be sequentially transmitted.

Next, the method of signaling to each subchannel group will be described. There are three types of modes, such as an SU-MIMO mode, an MU-MIMO mode and an NO BF mode, depending on a data frame transmission type via each subchannel. The foregoing three transmission modes are similar in that transmission times and lengths of NDP frames are matched when the AP conducts transmission via multi-subchannel downlinks, but are different in that different padding methods are employed to match the transmission times and the lengths of the NDP frames.

First, sounding in transmission to one STA by subchannel in SU-MIMO mode will be described. When SU BF sounding is performed, an STA INFO field of an NDPA payload is different by subchannel. However, a length of the field is the same despite a different value thereof, and thus an NDPA frame is subjected to the same MCS to be simultaneously transmitted via multi-subchannels. On the contrary, an NDP frame has different numbers of Long Training Fields (LTFs) for channel estimation by stream depending on a number of streams for which the STA conducts BF. Thus, LTFs for subchannels are padded to a longest LTF so as to match lengths of NDP frames.

Alternatively, subchannel sounding of FIG. 4 may be applied to an OFDMA communication system. Although a subchannel is SU BF in FIG. 4, subchannel sounding of FIG. 4 may be applied to a communication system in which SU MIMO and OFDMA are combined with subchannels in parallel.

In SST, the SST sounding process of FIG. 3 is needed and a subchannel selected by an STA is determined based on which subchannel the STA uses to transmit a frame. On the contrary, in the OFDMA system, the AP determines a subchannel to allocate to each STA, and the STA may transmit coarse feedback information, such as preferred subchannel information and channel status information, to the AP through a primary channel if the STA does not support SST.

Figure 5:
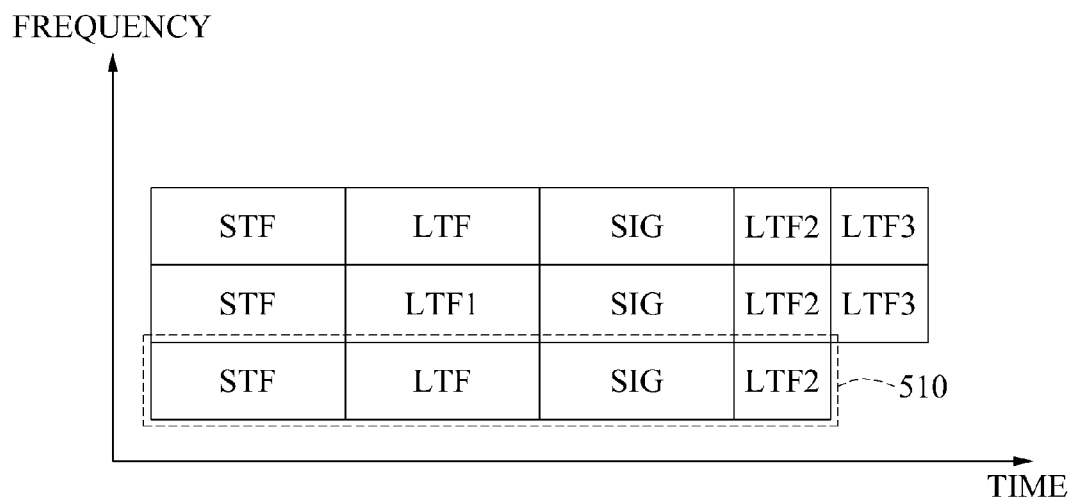
FIGS. 5 and 6 illustrate multi-subchannel transmission of a Null Data Packet (NDP) packet for a single-user multiple-input multiple-output (SU-MIMO) mode according to embodiments.
Figure 6:
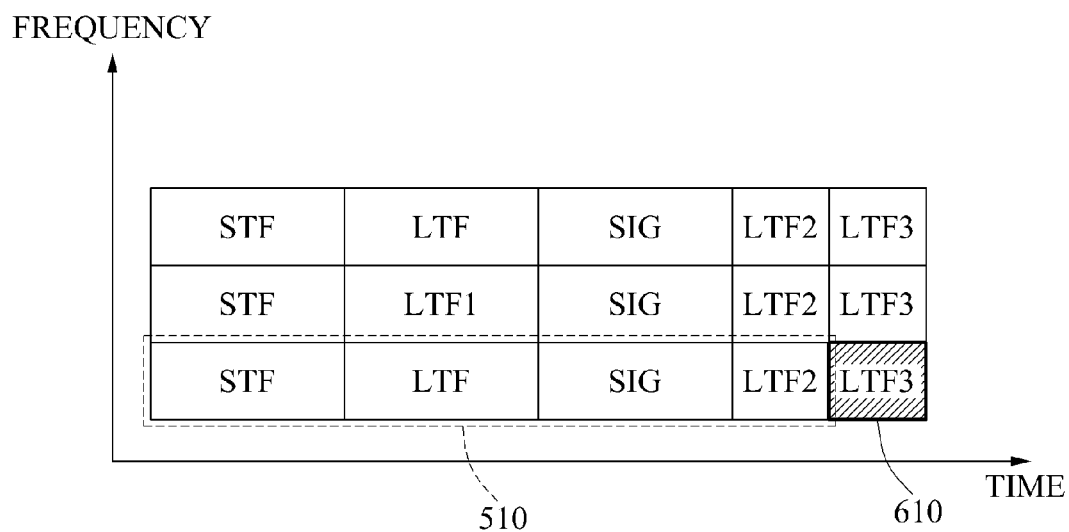

FIGS. 5 and 6 illustrate multi-subchannel transmission of an NDP packet for the SU-MIMO mode according to embodiments.

FIG. 5 illustrates an example of simultaneously transmitting NDP frames without padding when three subchannels are present. An NDP frame 510 lacks an LTF, and thus one more LTF needs padding for BF and compressed BF feedback frame time.

FIG. 6 illustrates an example of LTF padding. LTF3 610 is added to the NDP frame 510 by LTE padding. Alternatively, when an SU preamble of IEEE 802.11ac is used, a Number of Space Time Stream (NSTS) field of a Very High Throughput (VHT)-signal (SIG)-A1 field may be revised to a value of an NSTS field of a VHT-SIG-A1 field of an SU preamble of a subchannel having a largest number of LTFs among multi-subchannels. Then, although an unnecessary LTF is added, an STA waiting for an NDP packet via the subchannel detects the added LTF, but recognizes a number of streams allocated to the STA in NDPA and thus ignores the unnecessary LTF even though an NDP frame with the added LTF is received. Each STA may calculate a BF vector and transmit a feedback frame to the AP after an SIFS from an end of the NDP frame.

When MU BF sounding is performed, an STA INFO field of an NDPA payload in NDPA is different by subchannel, and a number of STA INFO fields may be determined based on a number of grouped STAs. Thus, to conduct simultaneous transmission to the STAs, the same number of STAs needs to participate in MU-MIMO by subchannel. As in the SU-MIMO mode, when the same MCS is used, the INFO fields have the same length with different values, and thus the NDPA frames may be simultaneously transmitted through multi-subchannels with lengths thereof matched. A number of LTFs of an NDP frame may be determined based on a total number of streams MU-transmitted by subchannel. Thus, LTF padding for subchannels is performed to a subchannel having a largest number of streams, similarly to the SU-MIMO mode.

Figure 7:
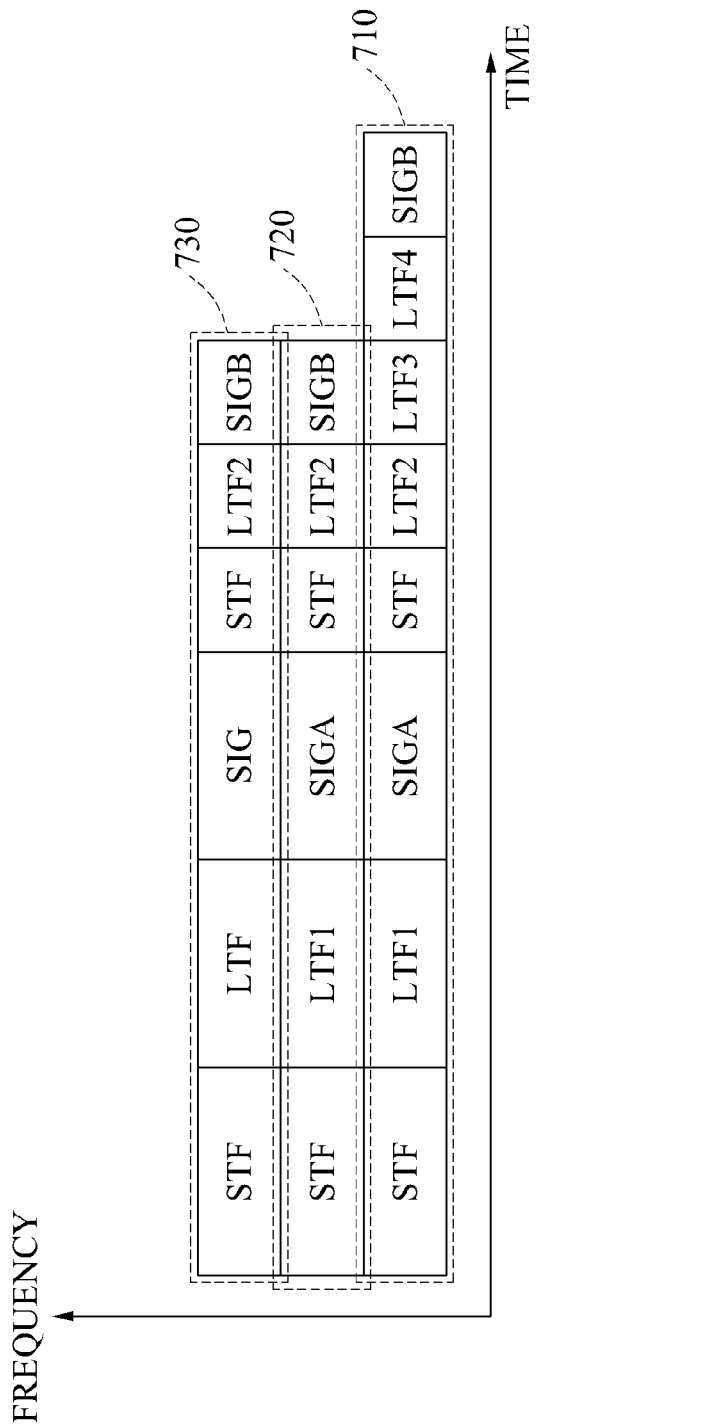
FIGS. 7 and 8 illustrate multi-subchannel transmission of an NDP packet for the multi-user multiple-input multiple-output (MU-MIMO) mode according to embodiments.
Figure 8:
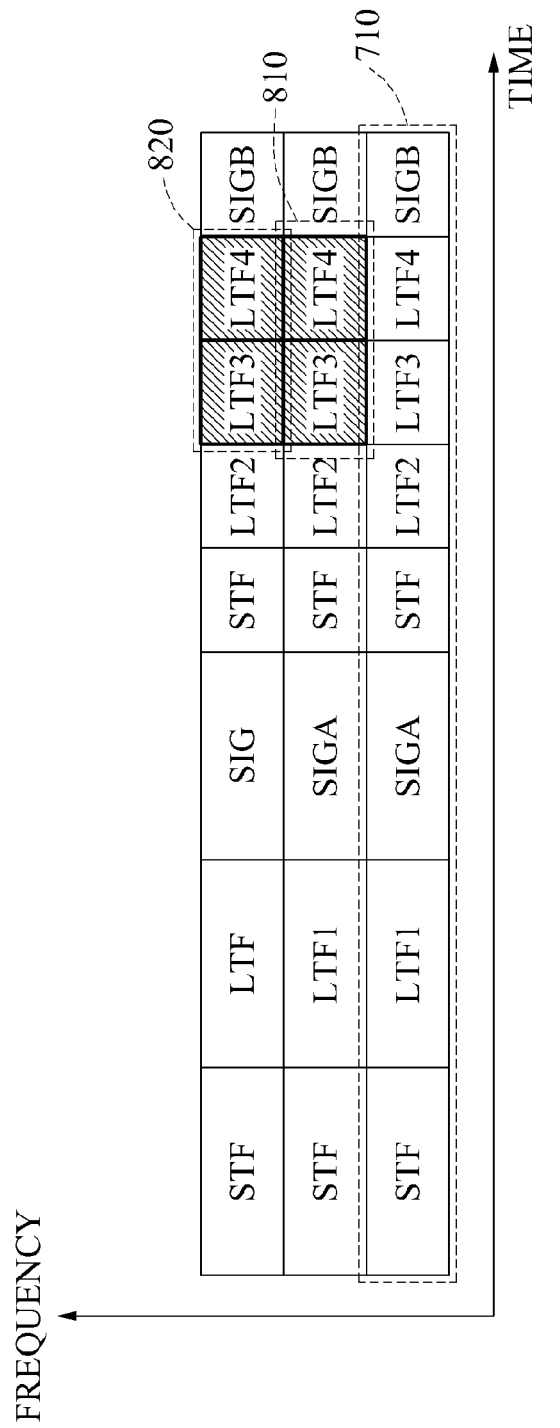

FIGS. 7 and 8 illustrate multi-subchannel transmission of an NDP packet for the MU-MIMO mode according to embodiments.

FIG. 7 illustrates an example of simultaneously transmitting NDP frames for the MU-MIMO mode without padding when three subchannels are present. When an AP has, for example, eight antennas, the AP conducts sounding for eight streams, in which a first subchannel has a largest number of streams transmitted as an MU-MIMO group which is four and a longest NDP frame 710. Thus, NDP frames 720 and 730 of other two subchannels are shorter and thus may be transmitted with two more LTFs padded, corresponding to the longest NDP frame 710, as if having four streams. For example, as shown in FIG. 8, the NDP frame 720 of FIG. 7 may be padded with two LTFs, LTF3 and LTF4 810, and the NDP frame 730 of FIG. 7 may be padded with two LTFs, LTF3 and LTF4 820.

Alternatively, when an MU preamble of IEEE 802.11ac is used, a sum of four fields, NSTS [0] to [3] fields, of VHT-SIG-A1 of the MU preamble is a total number of LTFs, and thus numbers of VHT-LTFs of MU preambles of subchannels are increased to a greatest sum of the NSTS [0] to [3] fields of a subchannel among all multi-subchannels. When the numbers of VHT-LTFs are increased, the AP may allocate additional LTFs to STAs allocated streams in an MU-MIMO group. Thus, the AP may match the total number of the four fields to a greatest sum of LTFs of a subchannel, increasing values of NSTS fields assigned the values other than 0 among the NSTS [0] to [3] fields.

An STA may identify a number of streams allocated to the STA and a total number of streams (a sum of streams of an STA INFO field) through an STA INFO field of an NDPA. Also, the STA may identify a number of streams allocated to the STA and an LTF position through an SIG field of an NDP. Although the number of streams allocated to the STA and the total number of streams in the NDP increase due to added LTFs as compared with in the NDPA, a greater number of streams than a number defined in the NDPA may be ignored. Thus, as in the SU-MIMO mode, the STA may identify positions and number of LTFs needed for sounding from a location of the STA and an NSTS field value of a previous STA through a group ID in an NDP preamble for MU-MIMO. In addition, the STA may use as many LTFs as a number of streams of the STA allocated in the NDPA frame at a corresponding LTF position for sounding and ignore subsequent LTFs additionally allocated in the NDP preamble.

When a length of the NDP frame is adjusted corresponding to a maximum number of antennas, a first beamformee STA receives in an MU-MIMO group of subchannels has a similar feedback transmission time after an SIFS, and thus the AP receives a feedback within a CP. When the feedback is not received within the CP due to a substantial variation in distance between the AP and the STA, the AP may need to perform ranging in advance so that STAs conduct transmission with an offset, not after an SIFS, thereby receiving the feedback within the CP. In a third case where an STA receives downlink data without conducting BF, a BF sounding process is unnecessary.

When the AP transmits data or an NDPA through SST, content in an SIG field may vary by subchannel. An AID or group ID for identifying an STA and an NSTS field may be encoded independently by subchannel.

A multi-subchannel transmission method in data transmission after sounding is carried out as follows. Regardless of performance of sounding and difference in method between the SU-MIMO mode/MU-MIMO mode, a data frame always includes a payload unlike an NDP frame. Thus, even when data frames have different lengths of preambles, lengths of the data frames may be adjusted by padding payloads. Data padding is possible in the MU-MIMO mode of IEEE 802.11ac, because an aggregated MAC protocol data unit (AMPDU) is used for transmission. It is assumed that an AMDPU is employed to use the same padding in the present invention. In the MU-MIMO mode, padding is used to match lengths in a PHY layer, and thus padding may be employed in the same manner. When an AMPDU is not supported, the lengths are difficult to match to cause different transmission times of response frames such as ACK frames, and thus different transmission times of STAs need to be set by allocating an offset. In addition, when an RAW is set using the IEEE 802.11ah technology and a resource allocation (RA) frame is used at a beginning of a DATA RAW, lengths of RA frames may be matched by using the same preamble and MCS, because an AID field used in the SU-MIMO mode or in the absence of BF has the same length as a group ID field in the MU-MIMO mode and thus payloads have the length.

In the OFDMA communication system, when an AP transmits an OFDMA indication frame and transmits data after an SIFS, the same operation as in SST may be performed. At 2.4 GHz and 5 GHz with legacy, an SIGA field is transmitted in common, and thus the AP may divide the SIGA field into an SIG A field and an SIG B field, transmit the SIG A field including subchannel allocation information in common, and subsequently transmit the SIG B including an AID/group ID by subchannel and NSTS. The SIG A field may be transmitted in DUP mode so that an STA is able to listen through all subchannels. Here, an OFDMA group including STA information by subchannel is defined in the SIG A field and an OFDMA group ID may be included therein. The STA may determine through the SIGA A field whether a subchannel is allocated to the STA and operate in sleep mode when the subchannel is not allocated to the STA.

Figure 9:
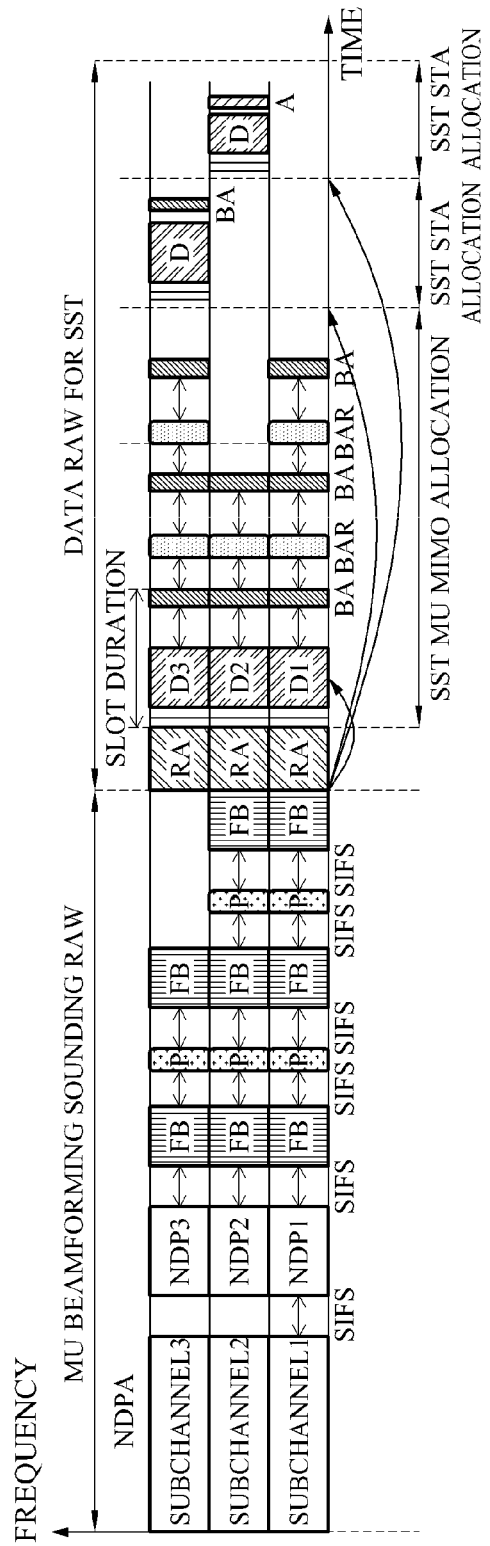
FIG. 9 illustrates a scheduling operation of an AP according to another embodiment.

FIG. 9 illustrates a scheduling operation of an AP according to another embodiment.

In SST according to one embodiment, the AP and STAs operate as follows. In detail, FIG. 9 shows that the AP schedules packet transmission times and frame transmission durations to conduct MU-MIMO BF sounding and MU-MIMO data transmission so as to simultaneously conduct a plurality of SSTs in SST.

To match the transmission durations, both the AP and the STAs need to perform LTF padding on NDP packets and to perform aggregate-MAC protocol data unit (A-MPDU) padding on a normal A-MPDU packet.

In FIG. 9, 'P' represents a BF report poll frame, and 'BAR' represents a Block ACK Request frame. 'BA' represents a Block ACK frame, and 'A' represents an ACK frame. 'FB' represents a compressed BF feedback frame, and 'RA' represents an RA frame. 'D1', 'D2' and 'D3' represent data frames transmitted from the AP to the STAs through subchannel 1, subchannel 2 and subchannel 3, respectively.

SST is basically performed through a 2 MHz-unit subchannel but may also be conducted via a combination of subchannels. To allow the STAs to select optimal subchannels, the AP may conduct channel sounding, in which regarding channel sounding, there are a parallel mode of transmitting a sounding packet in the iterative bandwidth mode based on a basic unit of 2 MHz and a series mode of sequentially transmitting packets by 2 MHz.

When the packets transmitted through the subchannels are received, the STAs may conduct channel estimation and select subchannels optimal for the STAs. The STAs may transmit a packet to the AP through the selected subchannels to implicitly announce information on the selected subchannels. When SU-MIMO BF is needed for the STAs subsequently, SU-MIMO BF sounding is necessarily performed before data transmission. However, since SU-MIMO BF sounding is performed on one STA at a time, decreasing air time is needed. To decrease air time, the AP may conduct SST sounding and SU-MIMO BF sounding using NDP packets with the same format so as to perform SU-MIMO BF sounding simultaneously with SST sounding.

Alternatively, subchannel sounding of FIG. 9 may be applied to the OFDMA communication system. In this case, FIG. 9 illustrates MU BF by subchannel in a combination of OFDMA and MU-MIMO. In the OFDMA system, an AP determines subchannels to allocate to STAs, and the STAs may transmit coarse feedback information, such as preferred subchannel information and channel status information, to the AP through a primary channel if the STAs do not support SST.

Figure 10:
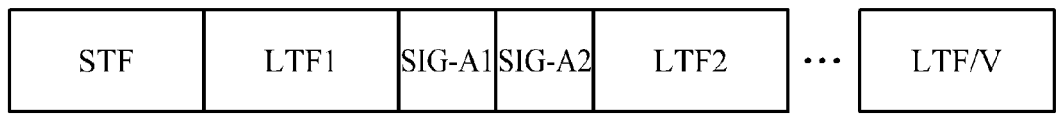
FIG. 10 illustrates a format of an NDP sounding packet in IEEE 802.11ah according to an embodiment.

FIG. 10 illustrates a format of an NDP sounding packet in IEEE 802.11ah according to an embodiment.

It may be identified how many space time streams are used through An NSTS field of SIG-A1 of the NDP sounding packet. When SST sounding is performed, an NDP sounding format with a long preamble, not with a short preamble having a single LTF only, may be used so that an STA capable of performing BF selects a subchannel based on a plurality of antenna stream channels. Each STA may select a suitable subchannel for the STA based on BF capability and space time stream processing ability of the STA.

Figure 11:
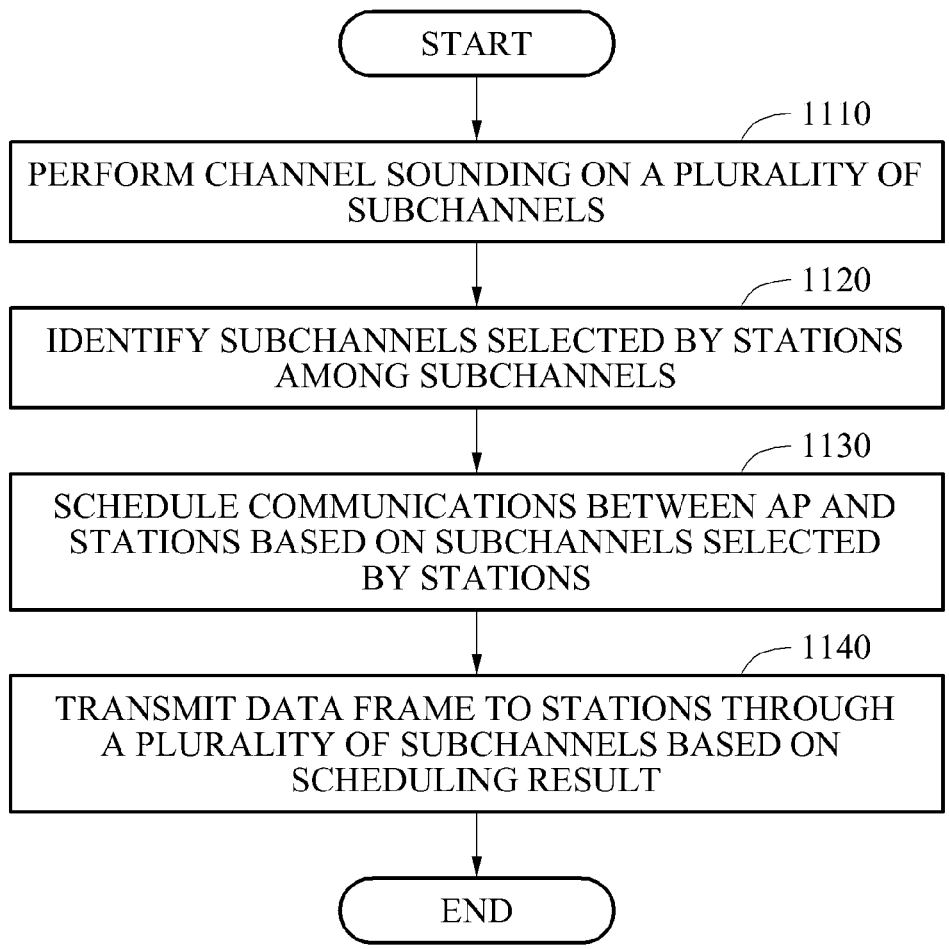
FIG. 11 is a flowchart illustrating operations of a wireless communication method performed by an AP according to an embodiment.

FIG. 11 is a flowchart illustrating operations of a wireless communication method performed by an AP according to an embodiment.

In operation 1110, the AP may perform channel sounding on a plurality of subchannels. The AP may transmit sounding frames for channel sounding through the subchannels. The AP may set an RAW and transmit NDP frames through the respective subchannels within a time interval of the RAW. The NDP frames may be transmitted with an LTF padded such that the NDP frames transmitted through the subchannels have the same length.

STAs may perform channel estimation based on the NDP frames transmitted by the AP. The STAs may select a subchannel to use for communication among the plurality of subchannels based on a channel estimation result. After the sounding frames are received, the STAs may transmit a feedback on channel information and subchannel selection information to the AP.

In operation 1120, the AP may identify subchannels selected by the STAs among the subchannels. The respective STAs may transmit a frame to the AP through the selected subchannels. The AP may identify the subchannels selected by the STAs based on the subchannels through which the frame is transmitted from the STAs.

Alternatively, the STAs may transmit information on at least one or more preferred subchannels among the plurality of subchannels to the AP. The AP may receive the subchannel selection information from the STAs and identify the subchannels selected by the STAs based on the received subchannel selection information. The subchannel selection information may include selection information on at least one subchannel preferred by the STAs among the subchannels.

In operation 1130, the AP may schedule communications between the AP and the STAs based on the subchannels selected by the STAs. The AP may schedule a group of STAs to which a data frame is simultaneously transmitted through different subchannels based on the subchannels selected by the STAs. The AP may schedule a frequency resource used for communications between the AP and the STAs based on the subchannels selected by the STAs. Subsequently, the AP may broadcast information on the scheduled frequency resource. The STAs may adjust a size of a feedback frame and transmit the feedback frame with the adjusted size to the AP.

In operation 1140, the AP may transmit a data frame to the STAs through the subchannels based on a scheduling result of operation 1130. The AP may simultaneously transmit a data frame to the STAs through different subchannels based on the scheduling result. The AP may simultaneously transmit the data frame to the STAs through antennas corresponding to the respective subchannels based on the scheduling result.

According to one embodiment, the AP may identify all multi-subchannels as a single group ID to conduct signaling. Alternatively, the AP may select an SU-MIMO mode or MU-MIMO mode for each subchannel. The AP may identify a subchannel with the SU-MIMO mode selected as an AID to conduct signaling and identify a subchannel with the MU-MIMO mode selected as a group ID to conduct signaling. Operations of the AP not mentioned in FIG. 11 may refer to descriptions of FIGS. 1 to 10.

Figure 12:
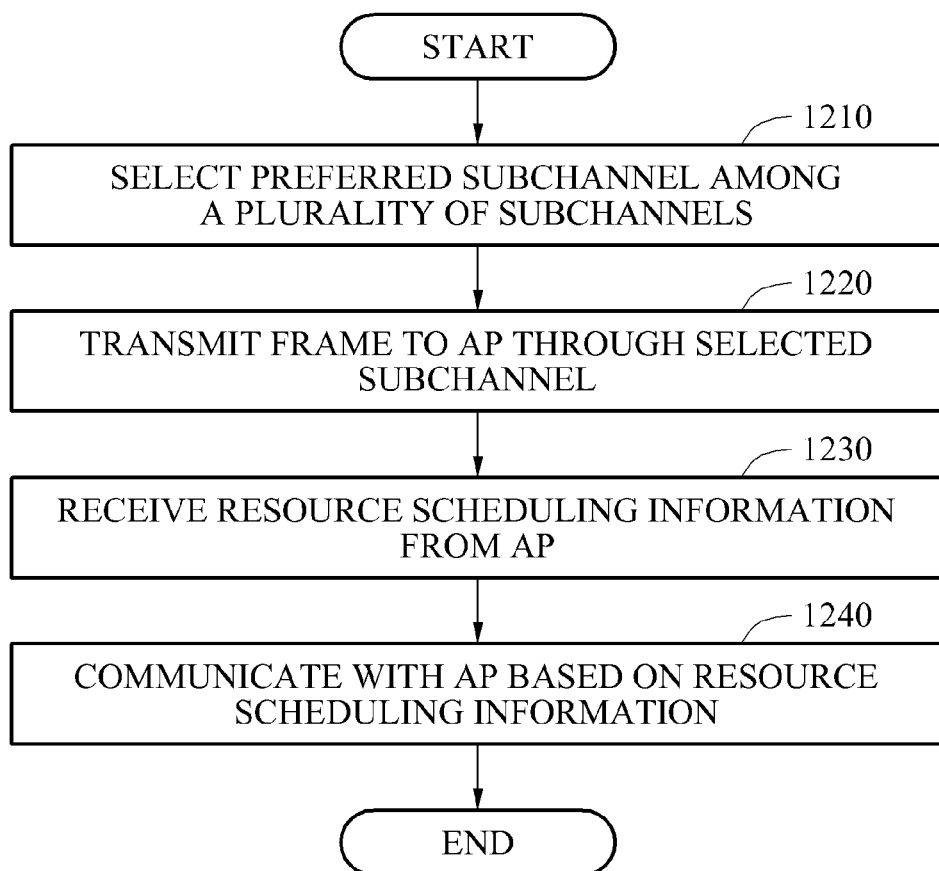
FIG. 12 is a flowchart illustrating operations of a wireless communication method performed by a station according to an embodiment.

FIG. 12 is a flowchart illustrating operations of a wireless communication method performed by an STA according to an embodiment.

In operation 1210, an STA may select a preferred subchannel from a plurality of subchannels. The STA may perform channel estimation based on an NDP frame received from an AP and select the preferred subchannel from the subchannels based on a channel estimation result. The NDP frame may be transmitted through each subchannel within a time interval of an RAW set by the AP. The NDP frame may be transmitted with an LTF being padded such that NDP frames transmitted through the subchannels have the same length. For instance, the STA may perform channel estimation by subchannel in a channel sounding process performed by the AP and select a subchannel with a most favorable SNR as the preferred subchannel.

In operation 1220, the STA may transmit a frame to the AP through the subchannel selected in operation 1210. For instance, the STA may transmit a PS-Poll frame to the AP. Frame transmission from the STA may be protected by the RAW set by the AP.

In operation 1230, the STA may receive resource scheduling information from the AP. The AP may schedule a group of STAs to which a data frame is simultaneously transmitted through different subchannels based on subchannel selected by STAs. The AP may schedule frequency resources used for communications between the AP and the STAs based on the subchannels selected by the STAs. Subsequently, the AP may broadcast resource scheduling information on the scheduled frequency resources.

In operation 1240, the STA may communicate with the AP based on the resource scheduling information. The AP may simultaneously transmit a data frame to the STAs through antennas corresponding to the subchannels based on a scheduling result. Operations of the STA not mentioned in FIG. 12 may refer to descriptions of FIGS. 1 to 10.

Figure 13:
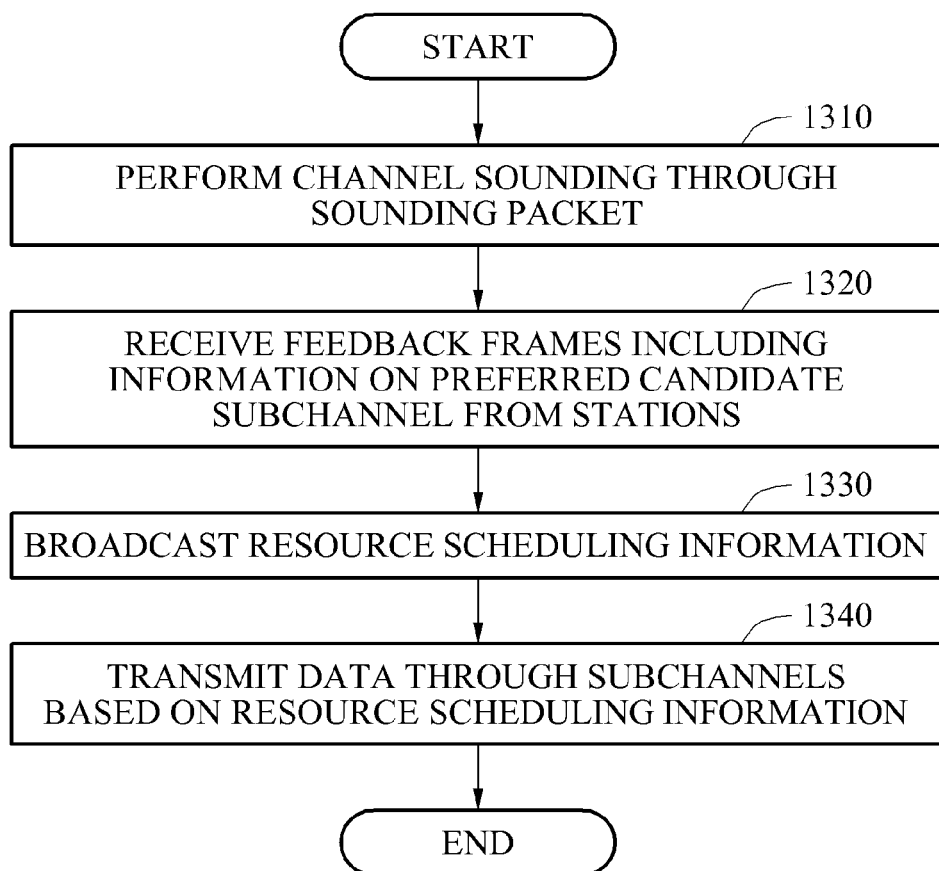
FIG. 13 is a flowchart illustrating operations of a wireless communication method performed by an AP according to another embodiment.

FIG. 13 is a flowchart illustrating operations of a wireless communication method performed by an AP according to another embodiment.

In operation 1310, the AP may perform channel sounding through a sounding packet. For example, the AP may sequentially or simultaneously transmit an NDP frame through subchannels. STAs may perform channel estimation on the subchannels based on the received NDP frame and determine candidate subchannels preferred by the STAs from the plurality of subchannels.

In operation 1320, the AP may receive feedback frames including information on the preferred candidate subchannels from the STAs. The AP may allocate each STA a subchannel to use for communication to schedule a frequency resource. The AP may allocate STAs subchannels to use for communications and control the STAs to conduct channel sounding in parallel through the allocated subchannels.

The AP may control the STAs to adjust transmission times and sizes of the feedback frames received from the STAs. The AP may transmit packet duration information for matching the sizes (or lengths) of the feedback frames to the STAs. The STAs may adjust the sizes of the feedback frames based on the packet duration information received from the AP. The packet duration information may be included in any one of a scheduling announcement frame, an NDPA frame and a BF report poll frame at transmission. The AP may adjust the transmission times and sizes of the frames transmitted by the STAs to enable simultaneous transmissions even in an asynchronous WLAN system, thereby improving throughput of the system.

In operation 1330, the AP may broadcast resource scheduling information determine based on the information on the candidate subchannels. The AP may determine subchannels to allocate to the respective STAs based on the received information on the candidate subchannels and generate resource scheduling information including information on the subchannels allocated to the STAs. The AP may generate resource scheduling information on a frequency resource based on channel status information and the information on the candidate subchannels received from the STAs. The AP may broadcast the resource scheduling information generated by scheduling frequency resources between the AP and the STAs to the STAs. The STAs may perform channel sounding in the subchannels allocated by the AP.

In operation 1340, the AP may transmit data to the STAs through the subchannels based on the resource scheduling information. The AP may simultaneously transmit the data to the STAs through BF in the subchannels allocated to the respective STAs.

Operations of the AP and the STAs not mentioned herein may refer to relevant descriptions of FIGS. 1 to 12.

Figure 14:
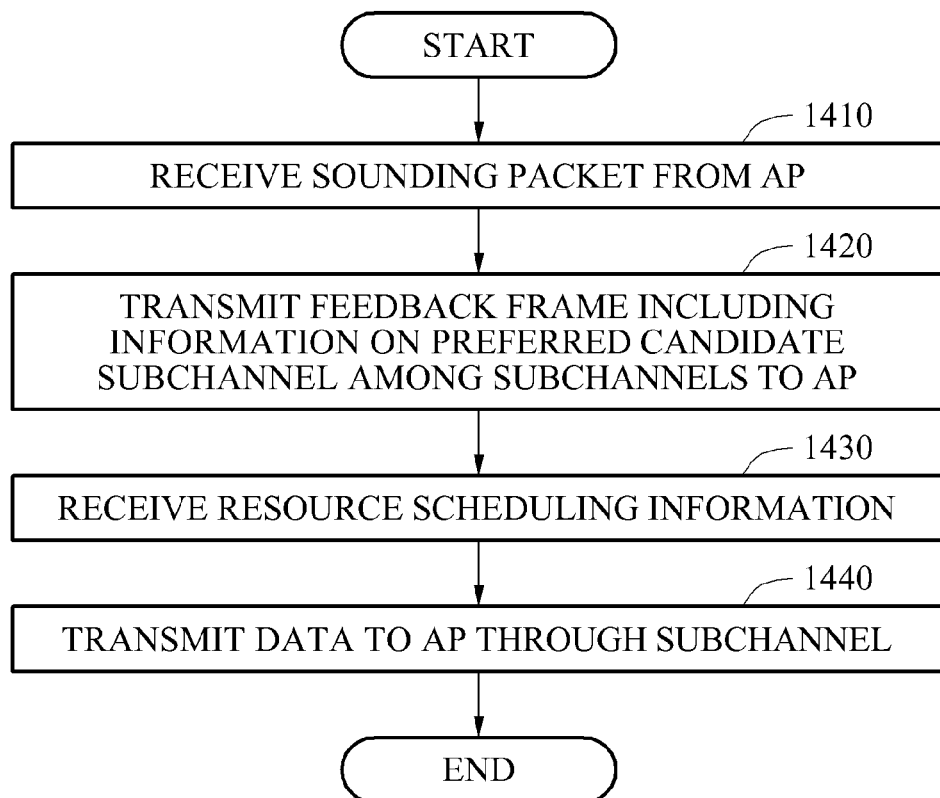
FIG. 14 is a flowchart illustrating operations of a wireless communication method performed by a station according to another embodiment.

FIG. 14 is a flowchart illustrating operations of a wireless communication method performed by an STA according to another embodiment.

In operation 1410, the STA may receive a sounding packet from an AP. The STA may perform channel estimation on a subchannel based on the sounding packet. For instance, the STA may estimate an SNR of the subchannel. The AP may sequentially or simultaneously transmit an NDP frame through subchannels, and the STA may perform channel estimation based on the NDP frame received from the AP.

In operation 1420, the STA may transmit a feedback frame including information on a preferred candidate subchannel of the plurality of subchannels to the AP. The STA may transmit a feedback frame on at least one subchannel among the subchannels used to transmit the NDP frame to the AP. The STA may select a preferred candidate subchannel among the subchannels and transmit information on the selected candidate subchannel through the feedback frame. The STA may transmit a list of preferred candidate subchannels among the subchannels to the AP. Here, the STA may adjust a size (or length) of the feedback frame based on packet duration information received from the AP and may transmit the feedback frame with the size adjusted back to the AP.

The STA may transmit channel status information along with the feedback frame to the AP. For instance, the STA may transmit SNR information on the subchannel or SNR information on a tone group to the AP.

The AP may schedule a frequency resource based on feedback frames and channel status information received from STAs and generate resource scheduling information. The AP may generate resource scheduling information based on the SNR information on the subchannel or the SNR information on the tone group.

In operation 1430, the STA may receive the resource scheduling information from the AP. The AP may schedule frequency resources based on information on candidate subchannels received from the plurality of STAs and generate resource scheduling information.

In operation 1440, the STA may identify a subchannel to be used for communications with the AP based on the resource scheduling information and transmit data to the AP through the identified subchannel. The STA may transmit the data to the AP at a transmit power level determined by the AP.

Operations of the AP and the STAs not mentioned herein may refer to relevant descriptions of FIGS. 1 to 12.

The methods according to the embodiments may be realized as program instructions implemented by various computers and be recorded in non-transitory computer-readable media. The media may also include, alone or in combination, the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A wireless communication method performed by an access point (AP), the method comprising:
   transmitting a Null Data Packet (NDP) announcement frame through a channel including a plurality of subchannels;
   transmitting, a Short Inter-Frame Space (SIFS) after the NDP announcement frame, a NDP frame for channel sounding through the channel including the plurality of subchannels;
   transmitting a polling frame through the channel including the plurality of subchannels; and
   receiving feedback frames including feedback information of the stations from the stations simultaneously based on Multiple User-Multiple Input Multiple Output (MU-MIMO), wherein the feedback frames for respective stations are transmitted through the subchannels allocated to the stations,
   wherein the NDP announcement frame includes station information indicating stations being requested to transmit feedback and frequency resource information for which the AP requests feedback.

2. The method of claim 1,
   wherein the feedback frame is transmitted a SIFS after the polling frame.

3. The method of claim 1, wherein the method further comprises:
   scheduling communications between the AP and the stations based on the selected subchannels; and
   transmitting a data frame to the stations or receiving a data frame from the stations through the subchannels based on a scheduling result.

4. The method of claim 3, wherein scheduling the communications between the AP and the stations comprises scheduling a group of stations to which the data frame is simultaneously transmitted or received through different subchannels based on the selected subchannels.

5. The method of claim 4, wherein transmitting of the data frame includes simultaneously transmitting the data frame to the stations through different subchannels based on the scheduling result, and
   wherein receiving the data frame includes simultaneously receiving the data frame from the stations through different subchannels based on the scheduling result.

6. The method of claim 1, wherein identifying the subchannels selected by the stations identifies the subchannels selected by the stations based on subchannels through which a frame is transmitted from the stations.

7. The method of claim 1, wherein the NDP frame is transmitted within a time interval of a Restricted Access Window (RAW) set by the AP,
   wherein the NDP frame is transmitted with a Long Training Field (LTF) padded so that NDP frames transmitted through the subchannels have the same length.

8. The method of claim 7, wherein the stations perform channel estimation based on the NDP frame transmitted by the AP and select a subchannel to use for communications among the plurality of subchannels based on a channel estimation result.

9. The method of claim 1, wherein the feedback information includes a feedback on channel information and subchannel selection information to the AP after receiving the NDP frame.

10. The method of claim 1, wherein identifying the subchannels selected by the stations comprises receiving subchannel selection information from the stations; and identifying the subchannels selected by the stations based on the received subchannel selection information, and the subchannel selection information comprises selection information on at least one subchannel preferred by a station among the plurality of subchannels.

11. The method of claim 1, wherein the stations transmit a frame to the AP through the selected subchannels among the plurality of subchannels.

12. The method of claim 1, wherein the stations transmit information on at least one or more preferred subchannels among the plurality of subchannels to the AP.

13. The method of claim 1, wherein transmitting the data frame comprises identifying all multi-subchannels as one group identification (ID) to conduct signaling,
wherein transmitting the data frame simultaneously transmits data frames to the stations through antennas corresponding to the respective subchannels based on a scheduling result.

14. The method of claim 1, wherein transmitting the data frame comprises selecting a single-user multiple-input multiple-output (SU-MIMO) mode or multi-user multiple-input multiple-output (MU-MIMO) for each subchannel; and identifying a subchannel with the SU-MIMO mode selected as an association ID (AID) to conduct signaling and identifying a subchannel with the MU-MIMO mode selected as a group ID to conduct signaling.

15. The method of claim 1, wherein scheduling the communications between the AP and the stations comprises scheduling a frequency resource used for communications between the AP and the stations based on the subchannels selected by each station; and broadcasting information on the scheduled frequency resource,
wherein the stations adjust a size of a feedback frame and transmit the feedback frame with the size adjusted to the AP.

16. The method of claim 1,
wherein the feedback frame transmitted by the stations have a same length on the subchannels.

17. The method of claim 16,
wherein Aggregate Medium Access Control (MAC) Protocol Data Unit (A-MPDU) padding is applied to the feedback frame transmitted by the stations to have the same length on the subchannels.

18. A wireless communication method performed by a station, the method comprising:
receiving a Null Data Packet (NDP) announcement frame from an access point (AP) through a channel including a plurality of subchannels;
receiving, from the AP a Short Inter-Frame Space (SIFS) after the NDP announcement frame, a NDP frame for channel sounding through the channel including the plurality of subchannels;
receiving, from the AP, a polling frame through the channel including the plurality of subchannels; and
transmitting a feedback frame to the AP through a subchannel selected from among the plurality of subchannels, wherein the feedback frame includes feedback information of the station and at least one other station, and the feedback frame is simultaneously transmitted by the station and the at least one other station through the subchannels allocated to the respective stations based on Multiple User-Multiple Input Multiple Output (MU-MIMO),
wherein the NDP announcement frame includes station information indicating stations being requested to transmit feedback and frequency resource information for which the AP requests feedback.

19. An access point (AP) comprising:
at least one antenna;
a receiver;
a transmitter; and
a processor,
wherein the processor is configured to:
cause the transmitter to transmit a Null Data Packet (NDP) announcement frame through a channel, the channel including a plurality of subchannels;
cause the transmitter to transmit, a Short Inter-Frame Space (SIFS) after the NDP announcement frame, a NDP frame for channel sounding through the channel including the plurality of subchannels and, a polling frame through the channel including the plurality of subchannels; and
cause the receiver to receive feedback frames including feedback information of stations from the stations simultaneously based on Multiple User-Multiple Input Multiple Output (MU-MIMO), wherein the feedback frames for respective stations are transmitted through the subchannels allocated to the stations,
wherein the NDP announcement frame includes station information indicating stations being requested to transmit feedback and frequency resource information for which the AP requests feedback.

* * * * *